(12) United States Patent
Kimura et al.

(10) Patent No.: US 10,214,167 B2
(45) Date of Patent: Feb. 26, 2019

(54) ELECTRICAL WIRE GUIDE APPARATUS AND SLIDING DOOR ELECTRICAL WIRE GUIDE MODULE

(71) Applicant: Sumitomo Wiring Systems, Ltd., Yokkaichi, Mie (JP)

(72) Inventors: Yu Kimura, Mie (JP); Yuji Kida, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/239,996

(22) Filed: Aug. 18, 2016

(65) Prior Publication Data

US 2017/0050589 A1    Feb. 23, 2017

(30) Foreign Application Priority Data

Aug. 19, 2015    (JP) .................................. 2015-161665

(51) Int. Cl.
  *B60R 16/027*    (2006.01)
(52) U.S. Cl.
  CPC .................................. *B60R 16/027* (2013.01)
(58) Field of Classification Search
  CPC .................................. B60R 16/027; B60J 5/04
  See application file for complete search history.

(56) References Cited

U.S. PATENT DOCUMENTS

| | | | | |
|---|---|---|---|---|
| 6,070,931 A * | 6/2000 | Yamaguchi | ......... | B60R 16/0215 296/146.7 |
| 7,730,669 B2 * | 6/2010 | Kida | .................. | B60R 16/0215 174/72 A |
| 8,070,212 B2 * | 12/2011 | Shima | ................ | B60R 16/0207 296/146.9 |
| 9,150,168 B2 | 10/2015 | Inoue | | |
| 2004/0003543 A1 * | 1/2004 | Kobayashi | .......... | B60R 16/0215 49/360 |
| 2004/0083655 A1 * | 5/2004 | Suzuki | ................ | B60R 16/0215 49/360 |
| 2005/0148213 A1 * | 7/2005 | Takase | ................ | B60R 16/0215 439/34 |
| 2007/0125001 A1 * | 6/2007 | Choi | .................... | B60R 16/0215 49/360 |
| 2013/0181512 A1 * | 7/2013 | Terada | ................ | B60R 16/0215 307/10.1 |

FOREIGN PATENT DOCUMENTS

JP    2013067351 A    4/2013

* cited by examiner

*Primary Examiner* — Gregory J Strimbu

(74) *Attorney, Agent, or Firm* — Reising Ethington, P.C.

(57) ABSTRACT

A sliding door electrical wire guide module includes a sliding door and an electrical wire guide apparatus that are integrated with each other. The electrical wire guide apparatus includes: an electrical wire guide body for spanning a distance between a vehicle body and the sliding door and that is capable of undergoing curving deformation; a door-side bracket that is coupled to one end portion of the electrical wire guide body and is fixed to the sliding door; a body-side bracket that is coupled to the other end portion of the electrical wire guide body and is to be attached to the vehicle body, and a lock portion that is formed on the body-side bracket and is detachably locked to a receiving portion provided on the sliding door.

7 Claims, 5 Drawing Sheets

ELECTRICAL WIRE GUIDE APPARATUS AND SLIDING DOOR ELECTRICAL WIRE GUIDE MODULE

This Application claims the benefit of Japanese Application No. JP2015-161665, filed on Aug. 19, 2015, the contents of which are hereby incorporated by reference in their entirety.

FIELD

The present invention relates to an electrical wire guide apparatus and a sliding door electrical wire guide module.

BACKGROUND

JP 2013-067351A discloses an electrical wire guide apparatus for spanning a vehicle body and a sliding door in an approximately horizontal manner. This electrical wire guide apparatus is configured to include a long and thin electrical wire guide body, a body-side bracket for coupling one end portion of the electrical wire guide body to the vehicle body, and a door-side bracket for coupling the other end portion of the electrical wire guide body to the sliding door. A wire harness for supplying electrical power to electrical components and the like installed in the sliding door is inserted into the electrical wire guide body and the two brackets. The electrical wire guide body is constituted by coupling together multiple link members so as to be capable of pivoting relative to each other about shaft portions. The electrical wire guide body is displaced in the front-rear direction while undergoing curving deformation in the horizontal plane in conjunction with opening and closing of the sliding door.

JP 2013-067351A is an example of related art.

In the vehicle manufacturing process, the electrical wire guide apparatus and the sliding door are assembled into a module in advance, and the module is conveyed to the line for attachment to the vehicle body. Then the sliding door is assembled to the vehicle body, and the body-side bracket is fixed to the vehicle body.

FIG. 5 shows a case where an electrical wire guide apparatus 100, which includes brackets 102B and 102S provided at respective end portions of an electrical wire guide body 101, is assembled with a sliding door S into a module. With this module, it is conceivable to fix the door-side bracket 102S to a predetermined position on the sliding door S, and then temporarily assemble the body-side bracket 102B to the door-side bracket 102S using a hanging structure that has a recession and a protrusion (not shown). However, in the case of using a hanging structure that has a recession and a protrusion, both of the brackets 102B and 102S need to be provided with a portion for constituting the hanging structure, thus leading to a problem in which the shapes of the brackets 102B and 102S become complex. The brackets 102B and 102S are normally obtained by die molding using a resin material, and an increase in the complexity of the shapes of the brackets 102B and 102S leads to an increase in the cost of the dies (not shown).

The present invention has been achieved in light of the above-described circumstances, and an object thereof is to simplify the shape of a bracket.

SUMMARY

A sliding door electrical wire guide module according to a first aspect includes: a sliding door and an electrical wire guide apparatus that are integrated with each other, the electrical wire guide apparatus being constituted to include an electrical wire guide body for spanning a vehicle body and the sliding door in a state where an electrical wire is inserted therein, and that is capable of undergoing curving deformation, a door-side bracket that is coupled to one end portion of the electrical wire guide body and is fixed to the sliding door, a body-side bracket that is coupled to another end portion of the electrical wire guide body and is to be attached to the vehicle body, and a lock portion that is formed on the body-side bracket and is detachably locked to a receiving portion provided on the sliding door.

An electrical wire guide apparatus according to a second aspect includes: an electrical wire guide body for spanning a vehicle body and a sliding door in a state where an electrical wire is inserted therein, and that is capable of undergoing curving deformation; a door-side bracket that is coupled to one end portion of the electrical wire guide body and is to be fixed to the sliding door; a body-side bracket that is coupled to another end portion of the electrical wire guide body and is to be attached to the vehicle body; and a lock portion that is formed on the body-side bracket and is to be detachably locked to a receiving portion provided on the sliding door.

The body-side bracket is locked to the receiving portion provided on the sliding door, and is not locked to the door-side bracket, thus eliminating the need for the door-side bracket to have a structure for locking the body-side bracket. Accordingly, the shape of the door-side bracket can be simplified.

DRAWINGS

DESCRIPTION (a) In the first and second aspects of the present design, the body-side bracket may be provided with a restriction portion that restricts tilting of the body-side bracket by coming into contact with an outer surface of the sliding door in a state where the lock portion is locked to the receiving portion.

According to this configuration, by bringing the restriction portion into contact with the outer surface of the sliding door, tilting of the body-side bracket is restricted, thus making it possible to stably lock the body-side bracket to the sliding door.

(b) In the first aspect, the receiving portion and a fixing position of the door-side bracket on the sliding door may be arranged so as to be separated in a front-rear direction of the vehicle body.

According to this configuration, when the body-side bracket is locked to the receiving portion of the sliding door, the electrical wire guide body is in a state of being extended in the front-rear direction and conforming to the sliding door. Accordingly, it is possible to prevent the electrical wire guide body from becoming caught on another member during conveying, and it is possible to realize a reduction in occupied space during storage.

(c) In the first aspect, in configuration (b), the receiving portion may be arranged so as to correspond to an attachment position of the body-side bracket on the vehicle body when the sliding door is fully opened.

According to this configuration, in the step for attaching the sliding door to the vehicle body, and detaching the body-side bracket from the sliding door and attaching it to the vehicle body, the body-side bracket only needs to be moved a small amount in the width direction of the vehicle body. At this time, the end portion of the electrical wire guide body on the vehicle body side is caused to undergo a small amount of deformation so as to swing toward the vehicle body, but the electrical wire guide body is not displaced a large amount in the front-rear direction, and the curvature of the electrical wire guide body is not changed a large amount. Accordingly, in the process of moving the body-side bracket from the sliding door toward the vehicle body, the end portion of the electrical wire guide body on the sliding door side can be kept in an appropriate curved shape. Accordingly, it is possible to prevent the electrical wire guide body from undergoing inappropriate deformation in the processing of opening/closing the sliding door.

First Embodiment

Figure 1:
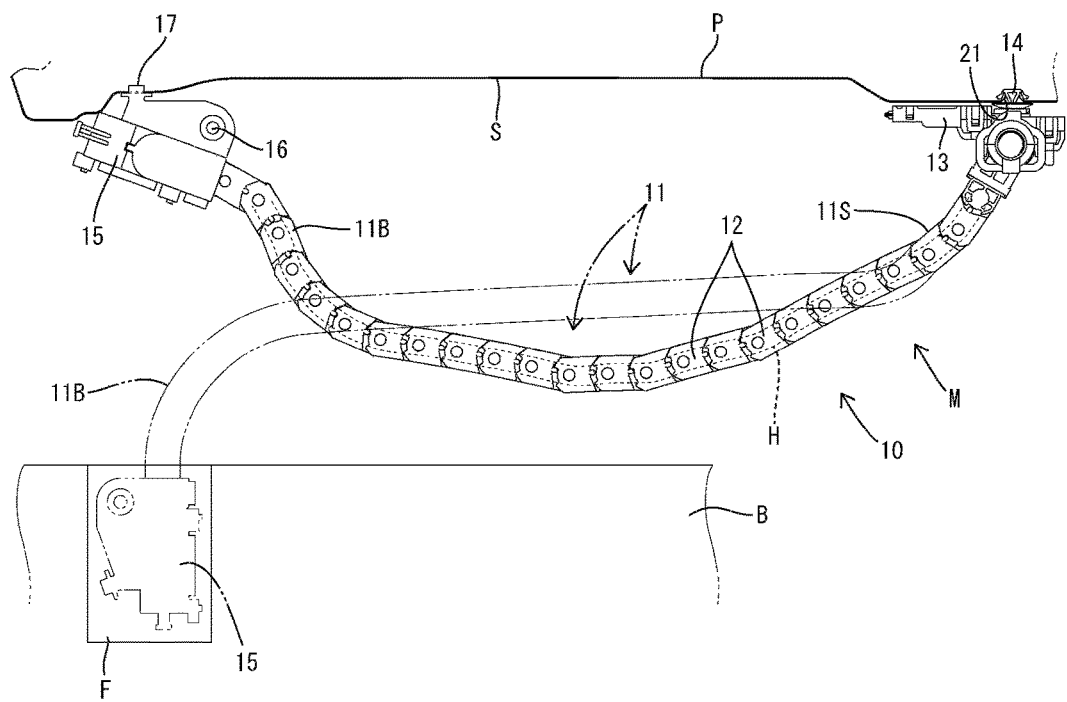
FIG. 1 is a plan view of a sliding door electrical wire guide module according to a first embodiment.
Figure 2:
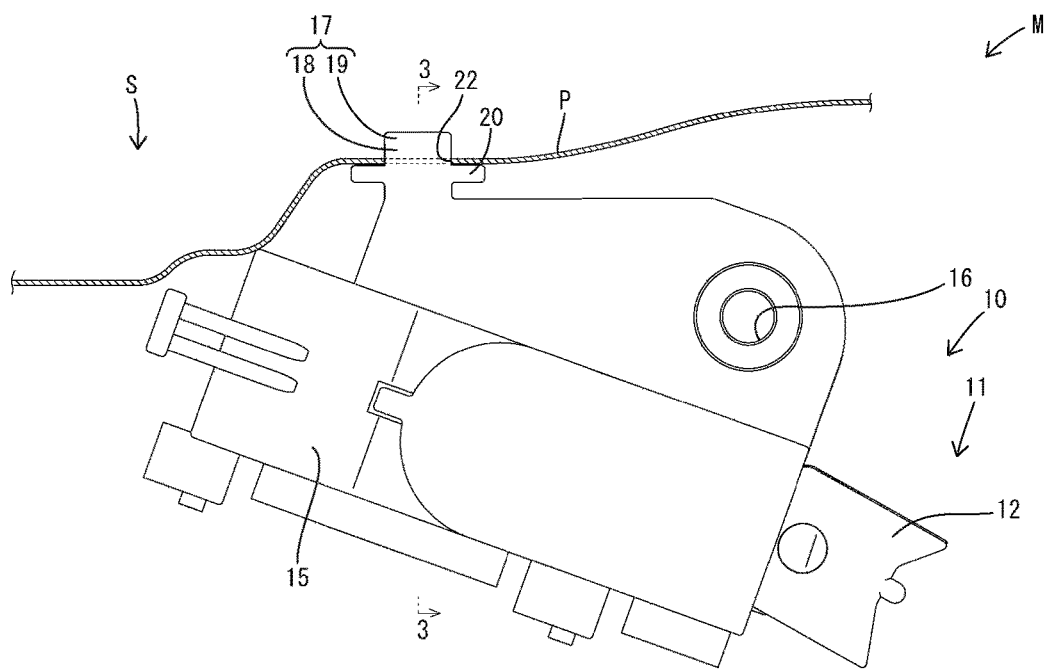
FIG. 2 is an enlarged partial plan view of a lock portion for locking a body-side bracket to a sliding door.

Hereinafter, a first embodiment will be described with reference to FIGS. 1 to 4. In a sliding door electrical wire guide module M of the first embodiment, a sliding door S not yet assembled to a vehicle body B is integrated with an electrical wire guide apparatus 10 not yet attached to the vehicle body B, thus facilitating conveying to an assembly line (not shown) for the vehicle body B and the sliding door S. Note that regarding the term "front-rear direction" used in the following description, the left side in FIG. 1 is defined as the front side. Also, FIG. 1 shows the electrical wire guide apparatus 10 in a state where the sliding door S has been assembled to the vehicle body B and is in the fully-open state.

The electrical wire guide apparatus 10 is configured to include a long and thin electrical wire guide body 11, a door-side bracket 13 made of a synthetic resin, and a body-side bracket 15 made of a synthetic resin. The electrical wire guide body 11 is constituted by coupling together multiple link members 12, which are made of a synthetic resin, in a single line and so as to be able to pivot relative to each other in the horizontal direction. The door-side bracket 13 is coupled to one end portion (the link member 12 located the farthest on the sliding door S side) of the electrical wire guide body 11 so as to be able to pivot in the horizontal direction. A clip 14 for fixture to the sliding door S is formed on the door-side bracket 13.

The body-side bracket 15 is coupled to the other end portion (the link member 12 located the farthest on the vehicle body B side) of the electrical wire guide body 11 so as to be able to pivot in the horizontal direction. A bolt hole 16 for fixing the body-side bracket 15 to the vehicle body B, a lock portion 17, and a restriction portion 20 are formed so as to be integrated with the body-side bracket 15.

Figure 3:
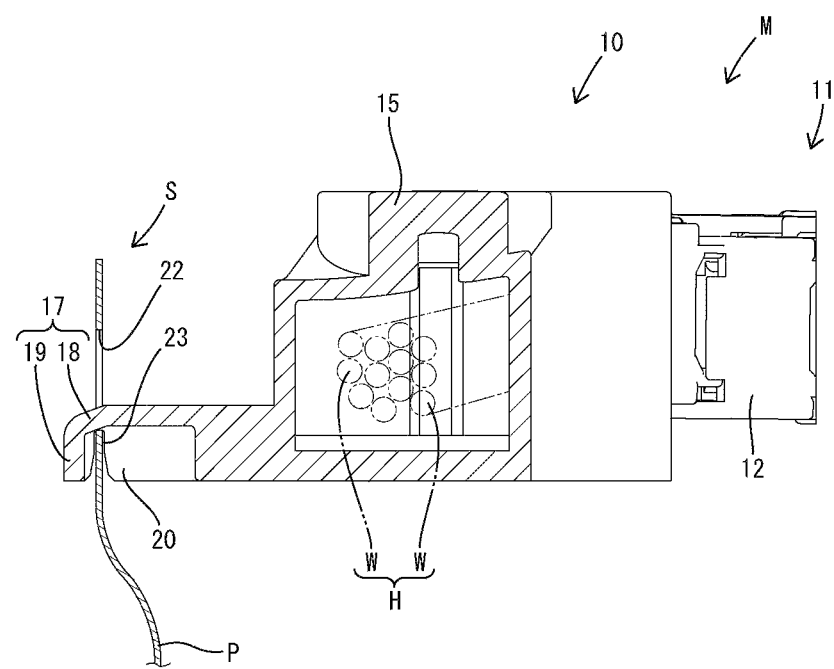
FIG. 3 is a cross-sectional view taken along line 3-3 in FIG. 2.
Figure 4:
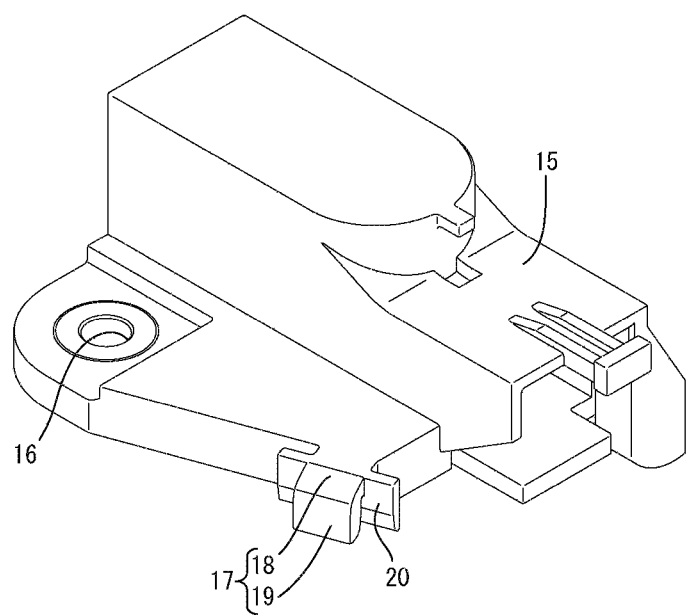
FIG. 4 is a perspective view of the body-side bracket.

The lock portion 17 is formed so as to be integrated with the outer surface of the body-side bracket 15. As shown in FIG. 3, the lock portion 17 is constituted by a projection portion 18 that extends horizontally from the outer side surface of the body-side bracket 15, and a claw portion 19 that is shaped as a flat plate that extends downward from the projecting end of the projection portion 18. The restriction portion 20 is arranged between the claw portion 19 and the outer surface of the body-side bracket 15, and opposes the claw portion 19 with a predetermined gap (having approximately the same dimension as the thickness of a later-described panel P of the sliding door S) therebetween. The formation area of the restriction portion 20 in the front-rear direction is set larger than the claw portion 19.

As shown in FIG. 1, a wire harness H is inserted into the electrical wire guide body 11 and the two brackets 13 and 15 having the above-described configurations. The wire harness H is for supplying electrical power to electrical components and the like installed in the sliding door S, and is constituted by bundling electrical wires W that function as conduction paths for electrical power supply (see FIG. 3).

As shown in FIG. 1, a fixing portion F for fixing the body-side bracket 15 is provided on the vehicle body B. The fixing portion F is arranged in the vicinity of the doorway (not shown) opened and closed by the sliding door S. Also, a fixing hole 21 for fixing the door-side bracket 13 is formed in the panel P that constitutes the sliding door S. Also, a receiving portion 22 shaped so as to pass through the panel P is formed in the sliding door S at a position forward of the fixing hole 21. When the sliding door S is in the fully-opened state, the fixing portion F of the vehicle body B and the receiving portion 22 of the sliding door S are at approximately the same position in the front-rear direction. In other words, the fixing portion F and the receiving portion 22 are positioned so as to be side-by-side in the left-right direction.

The receiving portion 22 is shaped as an approximately square window hole, and the opening dimension of the receiving portion 22 in the front-rear direction is set to a dimension the same as or slightly larger than the width dimension of the lock portion 17 of the body-side bracket 15. Also, the opening dimension of the receiving portion 22 in the up-down direction is set to a dimension the same as or slightly larger than the vertical dimension of the lock portion 17. Also, a region of the inner surface of the panel P that is in the vicinity of the bottom of the receiving portion 22 functions as a restriction surface 23, which is a flat surface that extends in the vertical direction.

Next, actions of the present embodiment will be described. When the sliding door S is to be conveyed to the line for assembly to the vehicle body B, as shown by solid lines in FIG. 1, the sliding door S and the electrical wire guide apparatus 10 are integrated as the sliding door electrical wire guide module M in advance. Specifically, the door-side bracket 13 is fixed to the sliding door S by fitting the clip 14 into the fixing hole 21. Also, the lock portion 17 of the body-side bracket 15 is locked to the receiving portion 22 of the sliding door S.

When locking the lock portion 17 to the receiving portion 22, the claw portion 19 is inserted from outside the panel P into the receiving portion 22 so as to move to the inward side of the panel P, and then the lock portion 17 is moved downward such that the projection portion 18 is placed on (brought into contact with) the lower end portion of the opening edge of the receiving portion 22. Accordingly, the body-side bracket 15 is locked to the panel P (sliding door S). Also, the region of the panel P below the receiving portion 22 is sandwiched on the left and right by the claw portion 19 and the restriction portion 20, thus prevent slippage between the body-side bracket 15 and the panel P in the left-right direction and the front-rear direction.

After the sliding door electrical wire guide module M is conveyed to the line for assembly to the vehicle body B, the sliding door S is first assembled to the vehicle body B so as to be able to slide in the front-rear direction (i.e., so as to be able to open and close). Thereafter, as shown in FIG. 1, the sliding door S is put in the fully-opened state, and the lock portion 17 of the body-side bracket 15 is detached from the receiving portion 22 of the sliding door S. The detached body-side bracket 15 is moved toward the vehicle body B while being tilted approximately 90° toward the vehicle body B, and is then fixed to the fixing portion F as shown by the two-dot chain lines in FIG. 1.

At this time, the fixing portion F and the receiving portion 22 oppose each other at approximately the same position in the front-rear direction, and the gap between the sliding door S and the vehicle body B in the left-right direction is relatively narrow. For this reason, the path of movement of the body-side bracket 15 from the sliding door S (receiving portion 22) to the vehicle body B (fixing portion F) is short, and there is no need to move the body-side bracket 15 in the front-rear direction. Accordingly, a body-side end portion region 11B of the electrical wire guide body 11 that is coupled to the body-side bracket 15 undergoes deformation so as to swing in the left-right direction, but the amount of deformation of the other regions is very small.

In particular, a door-side end portion region 11S of the electrical wire guide body 11 that is coupled to the door-side bracket 13 is subjected to almost no pushing/pulling force from the body-side bracket 15 side, and thus undergoes almost no deformation. In the state where the body-side bracket 15 is locked to the lock portion 17 of the sliding door S, the door-side end portion region 11S is curved so as to move away from the sliding door S and bulge in a diagonally rearward direction. This curved shape is substantially the same shape as the appropriate curved shape when the body-side bracket 15 is fixed to the vehicle body B, the sliding door S is fully opened, and the door-side bracket 13 is located rearward of the body-side bracket 15. Accordingly, if the body-side bracket 15 is moved from the sliding door S to the vehicle body B and fixed thereto through the above procedure, there is no risk of the electrical wire guide body 11 becoming deformed into an inappropriate shape during opening/closing of the sliding door S, or becoming damaged due to undergoing inappropriate deformation.

Figure 5:
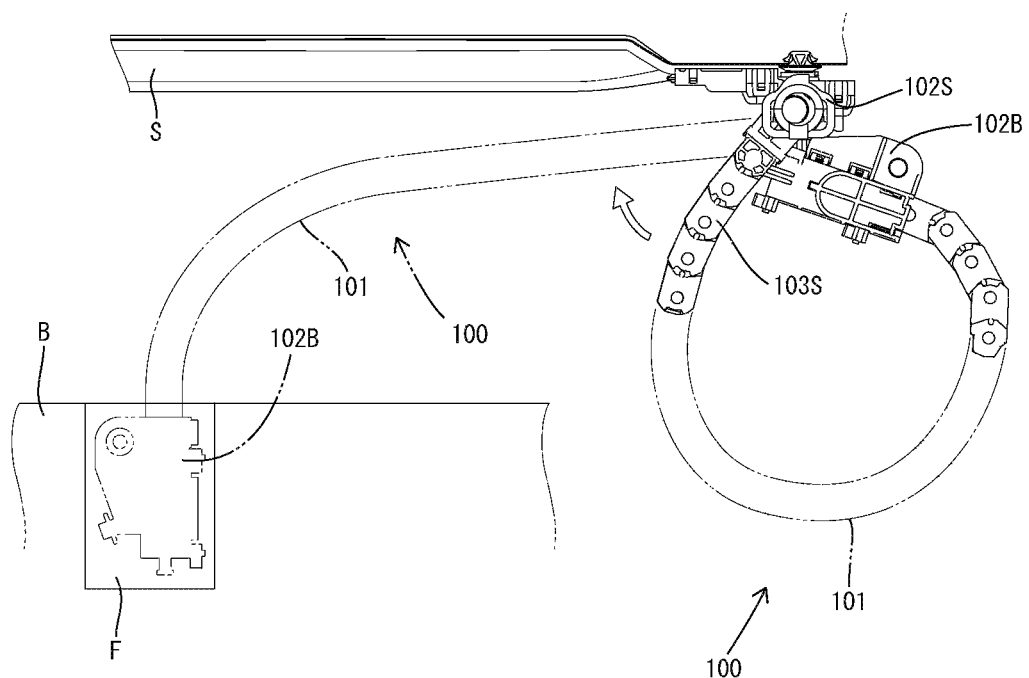
FIG. 5 is a plan view of a conventional example.

A comparative example for comparison with the first embodiment will be described below with reference to FIG. 5. In the configuration shown in FIG. 5, a door-side bracket 102S is fixed to the sliding door S, and a body-side bracket 102B is locked to the door-side bracket 102S. At this time, an electrical wire guide body 101 has a looped shape as shown by the one-dot chain lines in FIG. 5, and a door-side end portion region 103S of the electrical wire guide body 101 is curved so as to approach the sliding door S and bulge in the diagonally forward direction, conversely to the first embodiment.

Accordingly, in the step for detaching the body-side bracket 102B from the door-side bracket 102S and fixing it to the fixing portion F of the vehicle body B, the worker pushes the entirety of the electrical wire guide body 101, including the door-side end portion region 103S, toward the sliding door S, while overall displacing it in the forward direction. For this reason, when the operation for fixing the body-side bracket 102B to the fixing portion F has ended, the entirety of the electrical wire guide body 101, including the door-side end portion region 103S, has a simple curved shape in which it approaches the sliding door S and bulges in the diagonally forward direction, as shown by the two-dot chain lines in FIG. 5. In other words, the door-side end portion region 103S is not curved so as to move away from the sliding door S and bulge in the diagonally rearward direction as in the first embodiment.

The sliding door electrical wire guide module M of the present embodiment includes the sliding door S and the electrical wire guide apparatus 10 that are integrated with each other. The electrical wire guide apparatus 10 is configured to include the electrical wire guide body 11, the door-side bracket 13, and the body-side bracket 15. The electrical wire guide body 11 is constituted by coupling together multiple link members 12, and is for spanning the vehicle body B and the sliding door S in a state where electrical wires W are inserted therein, and is capable of undergoing curving deformation. The door-side bracket 13 is pivotably coupled to one end portion (door-side end portion region 11S) of the electrical wire guide body 11, and is fixed to the sliding door S. The body-side bracket 15 is pivotably coupled to the other end portion (body-side end portion region 11B) of the electrical wire guide body 11, and can be attached to the vehicle body B.

The lock portion 17, which is detachably locked to the receiving portion 22 provided on the sliding door S, is formed on the body-side bracket 15. The body-side bracket 15 is locked to the receiving portion 22 provided on the sliding door S, and is not locked to the door-side bracket 13, thus eliminating the need for the door-side bracket 13 to have a structure for locking the body-side bracket 15. Accordingly, the shape of the door-side bracket 13 can be simplified.

Also, the body-side bracket 15 is provided with the restriction portion 20 that restricts tilting of the body-side bracket 15 by coming into contact with the outer surface of the sliding door S in a state where the lock portion 17 is locked to the receiving portion 22. According to this configuration, by bringing the restriction portion 20 into contact with the outer surface of the sliding door S, tilting of the body-side bracket 15 is restricted, thus making it possible to stably lock the body-side bracket 15 to the sliding door S.

Also, the receiving portion 22 and the fixing position of the door-side bracket 13 on the sliding door S are arranged so as to be separated in the front-rear direction of the vehicle body B. According to this configuration, when the body-side bracket 15 is locked to the receiving portion 22 of the sliding door S, the electrical wire guide body 11 is in a state of being extended in the front-rear direction along the sliding door S. Accordingly, it is possible to prevent the electrical wire guide body 11 from becoming caught on another member during conveying, and it is possible to realize a reduction in occupied space during storage.

Also, when the sliding door S is fully opened, the receiving portion 22 is arranged so as to correspond to the attachment position of the body-side bracket 15 on the vehicle body B (i.e., so as to correspond to the fixing portion F). According to this configuration, in the step for attaching the sliding door S to the vehicle body B, and detaching the body-side bracket 15 from the sliding door S and attaching it to the vehicle body B, the body-side bracket 15 only needs to be moved a small amount in the width direction of the vehicle body B. At this time, the end portion of the electrical wire guide body 11 on the vehicle body B side (the body-side end portion region 11B) is caused to undergo a small amount of deformation so as to swing toward the vehicle body B, but the electrical wire guide body 11 is not displaced a large amount in the front-rear direction, and the curvature of the electrical wire guide body 11 is not changed a large amount. Accordingly, in the process of moving the body-side bracket 15 from the sliding door S toward the vehicle body B, the end portion of the electrical wire guide body 11 on the sliding door S side (the door-side end portion region 11S) can be kept in an appropriate curved shape. Accordingly, it is possible to prevent the electrical wire guide body 11 from undergoing inappropriate deformation in the processing of opening/closing the sliding door S.

Other Embodiments

The present invention is not limited to the embodiment described above using the foregoing description and drawings, and embodiments such as the following are also encompassed in the technical scope of the present invention.

(1) Although the restriction portion is formed on the body-side bracket in the above embodiment, there is no limitation to this, and a configuration is possible in which the restriction portion is not formed, and the body-side bracket swings in the front-rear direction or the left-right direction when locked to the receiving portion.

(2) Although the electrical wire guide body extends in the front-rear direction and conforms to the sliding door when the body-side bracket is locked to the receiving portion in the above embodiment, there is no limitation to this, and the electrical wire guide body may be curved in a looped shape when the body-side bracket is locked to the receiving portion.

(3) Although the receiving portion is arranged so as to correspond to the attachment position of the body-side bracket on the vehicle body when the sliding door is fully opened in the above embodiment, there is no limitation to this, and the position of the receiving portion and the attachment position of the body-side bracket on the vehicle body may be out of alignment by a large amount in the front-rear direction when the sliding door is fully opened.

(4) In the above embodiment, the lock portion is shaped as a projection, and the receiving portion is shaped as a hole, but there is no limitation to this, and a configuration is possible in which the lock portion is shaped as a hole, and the receiving portion is shaped as a projection, or both the lock portion and the receiving portion may be shaped as a projection.

(5) Although the electrical wire guide body is constituted by coupling together multiple link members in the above embodiment, there is no limitation to this, and the electrical wire guide body may be constituted by an exterior member made up of a single member such as a corrugated tube.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A sliding door electrical wire guide module comprising:
a sliding door and an electrical wire guide apparatus that are integrated with each other, the sliding door includes a panel with a receiving portion that includes a hole that passes through the panel, and the electrical wire guide apparatus includes:
an electrical wire guide body that is configured to span between a vehicle body and the sliding door in a state where an electrical wire is inserted in the electrical wire guide body, and that is capable of undergoing curving deformation when the sliding door is opened and closed with respect to the vehicle body,
a door-side bracket that is coupled to one end portion of the electrical wire guide body and is fixed to the sliding door,
a body-side bracket that is coupled to another end portion of the electrical wire guide body and is configured to be attached to the vehicle body during assembly of the sliding door to the vehicle body,
a lock portion that is formed on the body-side bracket and is configured to extend through the hole of the receiving portion on the sliding door, the lock portion includes a projection portion that extends from the body-side bracket and a claw portion connected at an end of the lock portion, and
a restriction portion that is formed on the body-side bracket and is configured to not extend through the hole of the receiving portion on the sliding door, wherein the lock portion and the restriction portion enable the body-side bracket to be detachably locked to the hole of the receiving portion on the sliding door before assembly of the sliding door to the vehicle body and enable the body-side bracket to be detached from the hole of the receiving portion on the sliding door after assembly of the sliding door to the vehicle body, wherein the hole has a first width and a first height, and the lock portion has a second width and a second height, the second width being substantially equal to the first width, and the second height being smaller than the first height.

2. The sliding door electrical wire guide module according to claim 1, wherein the restriction portion restricts tilting of the body-side bracket relative to the sliding door by coming into contact with an outer surface of the sliding door when the lock portion is locked to the receiving portion.

3. The sliding door electrical wire guide module according to claim 1, wherein the receiving portion and a fixing position of the door-side bracket on the sliding door are arranged so as to be separated along a length of the sliding door.

4. The sliding door electrical wire guide module according to claim 3, wherein the receiving portion is arranged so as to correspond to an attachment position of the body-side bracket on the vehicle body when the sliding door is fully opened.

5. The sliding door electrical wire guide module according to claim 1, wherein the restriction portion has a third width and a third height, the third width being greater than each of the first width and the second width, and the third height being smaller than the first height.

6. A mounting structure mounting an electrical wire guide apparatus to a sliding door, the mounting structure comprising:
a hole of a receiving portion on the sliding door;
an electrical wire guide body that is configured to span between a vehicle body and the sliding door in a state where an electrical wire is inserted in the electrical wire guide body, and that is capable of undergoing curving deformation when the sliding door is opened and closed with respect to the vehicle body, a door-side bracket that is coupled to one end portion of the electrical wire guide body and is fixed to the sliding door, a body-side bracket that is coupled to another end portion of the electrical wire guide body and is configured to be attached to the vehicle body during assembly of the sliding door to the vehicle body, a lock portion that is formed on the body-side bracket and is configured to extend through the hole of the receiving portion on the sliding door, the lock portion includes a projection portion that extends from the body-side bracket and a claw portion connected at an end of the lock portion, and a restriction portion that is formed on the body-side bracket and is configured to not extend through the hole of the receiving portion on the sliding door, wherein the lock portion and the restriction portion enable the body-side bracket to be detachably locked to the hole of the receiving portion on the sliding door before assembly of the sliding door to the vehicle body and enable the body-side bracket to be detached from the hole of the receiving portion on the sliding door after assembly of the sliding door to the vehicle body, wherein the hole of the receiving portion has a first width and a first height, and the lock portion has a second width and a second height, the second width being substantially equal to the first width, and the second height being smaller than the first height.

7. The mounting structure according to claim 6, wherein the restriction portion has a third width and a third height, the third width being greater than each of the first width and the second width, and the third height being smaller than the first height.

* * * * *